Aug. 7, 1923.
W. GARLAND
CIRCLE DIVIDER
Filed Feb. 14, 1922
1,464,417
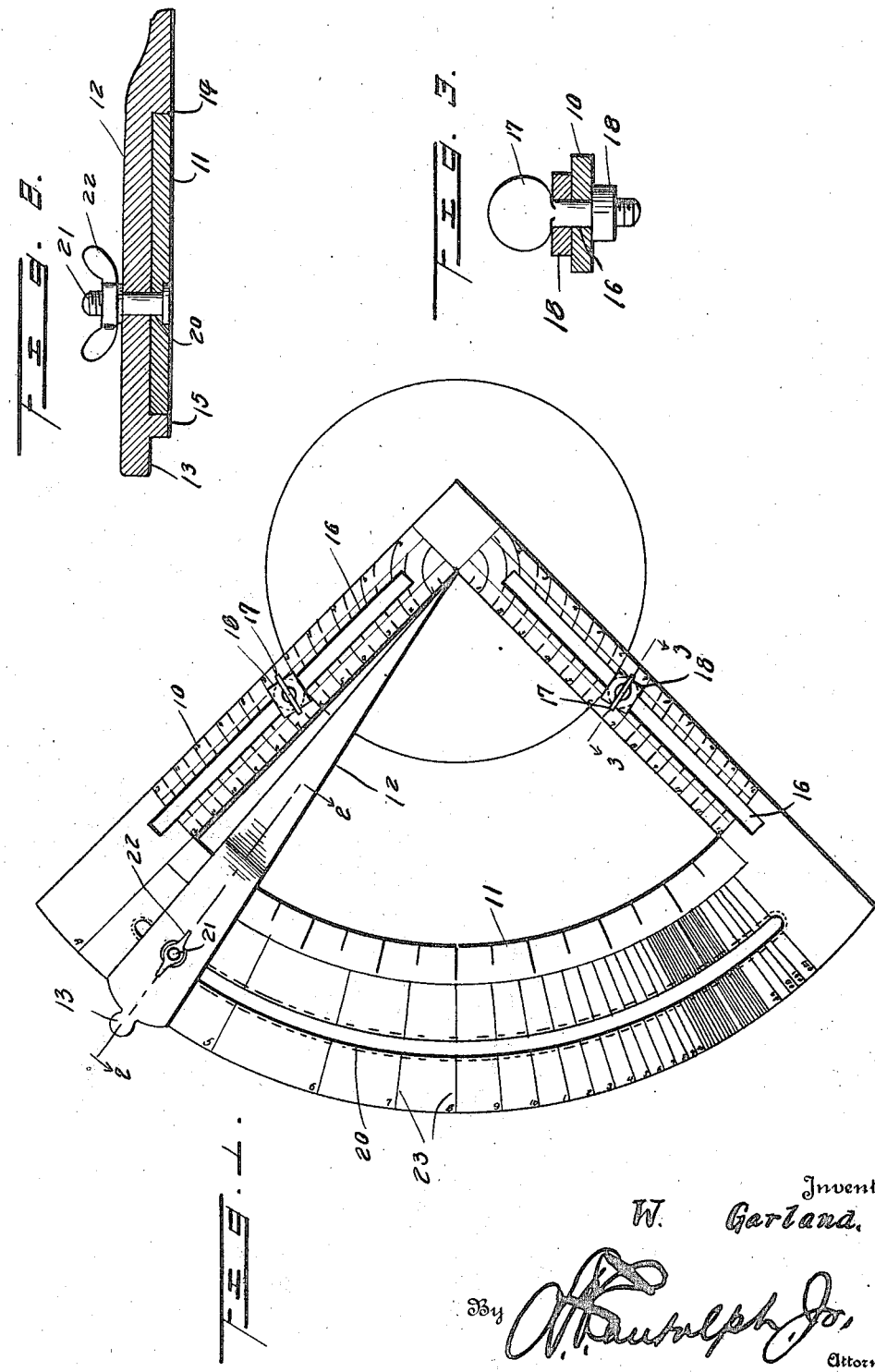

Patented Aug. 7, 1923.

1,464,417

UNITED STATES PATENT OFFICE.

WILLIAM GARLAND, OF CLINTON, MASSACHUSETTS.

CIRCLE DIVIDER.

Application filed February 14, 1922. Serial No. 536,407.

*To all whom it may concern:*

Be it known that I, WILLIAM GARLAND, a subject of the King of England, residing at Clinton, in the county of Worcester and State of Massachusetts, have invented certain new and useful Improvements in a Circle Divider; and I do hereby declare the following to be a full, clear, and exact description of the invention, such as will enable others skilled in the art to which it appertains to make and use the same.

The object of the invention is to provide a simple and accurate instrument for use in dividing circles of different diameters to indicate various peripheral and radial measurements or spacings, in connection with machine shop work, and under conditions requiring extreme accuracy; and with this object in view the invention consists in a construction and combination of parts of which a preferred embodiment is shown in the drawing, wherein:—

Figure 1 is a plan view of the instrument applied to a disk to be divided,

Figure 2 is a detail sectional view on the plane indicated by the line 2—2 of Figure 1, and Figure 3 is a section on the line 3—3 of Figure 1.

The instrument consists essentially of a quadrant having the right angularly disposed radial arms 10 and the connecting segment bar 11, and an indicator 12 movably mounted upon the quadrant and having convergent radially disposed side edges which meet at a point disposed in the angle between arms of the quadrant to constitute a fulcrum for the movement of the indicator. The indicator may be provided at its outer end with a suitable knob or grip 13 and on its under side is provided with projections forming guide shoulders 14 and 15 for engagement respectively with the inner and outer edges of the segment bar.

The radial arms are longitudinally slotted to form guides 16 for the set screws 17 of guide blocks 18 adapted to bear against the periphery of the disk 19 which is to be divided, and the said radial arms are graduated as indicated to facilitate adjustment and indicate radial measurements of the disk.

The segment bar is also longitudinally slotted as indicated at 20 for the clamp screw 21 which is fitted with a thumb nut 22 serving as a means of locking the indicator in adjusted positions in angular relation with the radial arms in accordance with graduations 23 on the segment bar and which graduations are laid off accurately to indicate circumferential or angular measurements which through the agency of the indicator can be transferred to the disk or circle 19 which is to be divided.

Having thus described the invention, what I claim is:—

1. A circle divider having a quadrant provided with right angularly disposed graduated radial arms terminally connected by a segmental bar, said arms and bar being respectively provided with linear and angular graduations, guides adjustably mounted upon the radial arms for engagement with the periphery of a disk or circle to be divided, and an indicator pivotally mounted upon the quadrant for swinging movement about the inner angle of the radial arms as an axis.

2. A circle divider having a quadrant provided with right angularly disposed graduated radial arms terminally connected by a segmental bar, said arms and bar being respectively provided with linear and angular graduations, guides adjustably mounted upon the radial arms for engagement with the periphery of a disk or circle to be divided, and an indicator pivotally mounted upon the quadrant for swinging movement about the inner angle of the radial arms as an axis, the indicator arm being provided with a clamp for securing it in adjusted position.

3. A circle divider having a quadrant provided with right angularly disposed graduated radial arms terminally connected by a segmental bar, said arms and bar being respectively provided with linear and angular graduations, guides adjustably mounted upon the radial arms for engagement with the periphery of a disk or circle to be divided, and an indicator pivotally mounted upon the quadrant for swinging movement about the inner angle of the radial arms as an axis, the indicator having radially disposed inwardly convergent edges meeting at a point for engagement with said inner angle of the radial arms.

4. A circle divider having a quadrant provided with right angularly disposed graduated radial arms terminally connected by a segmental bar, said arms and bar being respectively provided with linear and angular graduations, guides adjustably mounted upon the radial arms for engagement with the periphery of a disk or circle to be divided, and an indicator pivotally mounted upon the quadrant for swinging movement about the inner angle of the radial arms as an axis, said indicator having a reduced inner end seated in the angle formed by the inner edges of said radial arms and provided with shoulders to respectively traverse the inner and outer edges of the segment bar.

5. A circle divider having a quadrant provided with right angularly disposed graduated radial arms terminally connected by a segmental bar, said arms and bar being respectively provided with linear and angular graduations, guides adjustably mounted upon the radial arms for engagement with the periphery of a disk or circle to be divided, and an indicator pivotally mounted upon the quadrant for swinging movement about the inner angle of the radial arms as an axis, the segment bar being longitudinally slotted, and the indicator having a clamp screw and thumb nut for engagement therewith to lock the indicator in its adjusted positions.

6. A circle divider having a quadrant provided with right angularly disposed longitudnally slotted graduated radial arms terminally connected by a segmental bar, said arms and bar being respectively provided with linear and angular graduations, guides adjustably mounted upon the radial arms for engagement with the periphery of a disk or circle to be divided, and an indicator pivotally mounted upon the quadrant for swinging movement about the inner angle of the radial arms as an axis, said guiding means consisting of blocks having set screws operating in the longitudinal slots in the radial arms.

7. A circle divider having a quadrant provided with right angularly disposed graduated radial arms terminally connected by a segmental bar, said arms and bar being respectively provided with linear and angular graduations, and an indicator slidably mounted upon the quadrant for pivotal movement about the inner angle of the radial arms as an axis.

8. A circle divider having a quadrant provided with intersecting arms terminally connected by a segmental bar, said arms and bar being respectively provided with linear and angular graduations, guides adjustably mounted upon the intersecting arms for engagement with the periphery of a disk or circle to be divided, and an indicator pivotally mounted upon the quadrant for swinging movement about the inner angle of the intersecting arms as an axis.

9. A circle divider having a quadrant provided with right angularly disposed radial arms terminally connected by a segmental bar, guides adjustably mounted upon the radial arms for engagement with the periphery of a disk or circle to be divided, and an indicator pivotally mounted upon the quadrant for swinging movement about the inner angle of the radial arms as an axis.

In testimony whereof I affix my signature in presence of two witnesses.

WILLIAM GARLAND.

Witnesses:
Rev. HERMAN M. MOHR,
Mr. THOMAS MACK.